(12) United States Patent
Dominey et al.

(10) Patent No.: US 8,345,409 B2
(45) Date of Patent: Jan. 1, 2013

(54) SOLID ELECTROLYTIC CAPACITOR

(75) Inventors: Lawrence A. Dominey, N.E. Moses Lake, WA (US); Alex D. Smith, N.E. Moses Lake, WA (US)

(73) Assignee: Nippon Chemi-Con Corporation (JP)

( * ) Notice: Subject to any disclaimer, the term of this patent is extended or adjusted under 35 U.S.C. 154(b) by 257 days.

(21) Appl. No.: 12/751,429

(22) Filed: Mar. 31, 2010

(65) Prior Publication Data
US 2011/0242734 A1    Oct. 6, 2011

(51) Int. Cl.
*H01G 9/042* (2006.01)
(52) U.S. Cl. ........ 361/529; 361/523; 361/525; 361/528; 361/503; 361/504
(58) Field of Classification Search ................ 361/523, 361/516–519, 525, 528–529, 530, 428, 503–504; 29/25.01, 25.03
See application file for complete search history.

(56) References Cited

U.S. PATENT DOCUMENTS

| | | | | |
|---|---|---|---|---|
| 4,113,579 A | * | 9/1978 | Randall et al. | 205/153 |
| 4,204,919 A | * | 5/1980 | Randall et al. | 205/205 |

* cited by examiner

*Primary Examiner* — Nguyen T Ha
(74) *Attorney, Agent, or Firm* — George R. McGuire; Bond Schoeneck & King PLLC

(57) ABSTRACT

Provided is a high-voltage solid electrolytic capacitor having a rated voltage of several hundreds of volts. After an anodic oxide film layer is formed on a roughened surface of an aluminum foil by way of a first conversion treatment, a hydrated film is formed by way of boiling water immersion; the hydrated film is provided with a second conversion treatment at a formation voltage lower than that of the first conversion treatment such that an anodic foil is formed; and a conductive polymeric layer is formed on a surface of the anodic foil.

3 Claims, 3 Drawing Sheets

SOLID ELECTROLYTIC CAPACITOR

BACKGROUND

1. Field of Invention

The present invention relates to a solid electrolytic capacitor having a conductive polymeric compound as a solid electrolyte, and more particularly to a solid electrolytic capacitor that has been improved for better withstand voltage characteristics, and a method for producing the same.

2. Background of Art

Electrolytic capacitors comprising a metal having a valve action like aluminum and the like can obtain smaller size and higher capacitance by way of changing the shape of a valve action metal used as an anodic electrode to be an etched foil and the like so as to enlarge the surface area of a dielectric material, and thus are in widespread general use. In particular, solid electrolytic capacitors comprising a solid electrolyte as an electrolyte have features of smaller size and higher capacitance and also have a low equivalent series resistance.

Examples of the known solid electrolytes used for a solid electrolytic capacitor include a conductive polymer having a high conductance and a remarkable adhesivity to the oxide film layer of the anodic electrode. Examples of the known conductive polymers include polyaniline, polythiophene and polyethylenedioxy thiophene.

In particular, polyethylenedioxy thiophene (hereinafter, "PEDOT") has received attention as a conductive polymer capable of having greater withstand voltage because PEDOT can have greater withstand voltage relative to the thickness of an oxide film. A capacitor comprising the PEDOT is fabricated by way of a chemical oxidative polymerization in the following manner.

Namely, a capacitor element is formed by the anode and cathode electrode foils wound together with an intervening separator, and the capacitor element is impregnated with a solution containing EDOT and oxidizing agent, and is heated to form a PEDOT polymeric layer between the two electrode foils such that a solid electrolytic capacitor is formed. One such solid electrolytic capacitor is described in Japanese Laid-open Patent Publication No. H09-293639.

Unlike a conventional electrolytic solution capacitor, this type of solid electrolytic capacitor has a poor capacity to form an oxide film, and thus has limited withstand voltage characteristics. Accordingly, an electrolytic capacitor has been suggested that employs both electrolytic solution and solid electrolyte as electrolyte such that an oxide film formation capacity of the electrolytic solution is retained while remarkable characteristics of solid electrolytic capacitors are maintained. One such electrolytic capacitor is described in Japanese Laid-open Patent Publication No. 2000-021689.

This type of solid electrolytic capacitor has merely several tens of volts in rated voltage. In this context, the present invention is intended to provide a high-voltage solid electrolytic capacitor having a rated voltage of several hundreds of volts.

SUMMARY OF THE INVENTION

A solid electrolytic capacitor as a first aspect of the present invention, to address the above-mentioned problems, is an electrolytic capacitor wherein: an anodic oxide film layer is formed on a roughened surface of an aluminum foil by way of a first conversion treatment; a hydrated film is formed by way of boiling water immersion; the hydrated film is provided with a second conversion treatment at a formation voltage lower than that of the first conversion treatment such that an anodic foil is formed; and a conductive polymeric layer is formed on a surface of the anodic foil.

A method for producing a solid electrolytic capacitor as a second aspect of the present invention, to address the above-mentioned problems, is a method comprising the steps of: forming an anodic oxide film layer on a roughened surface of an aluminum foil by way of a first conversion treatment; forming a hydrated film by way of boiling water immersion; providing the hydrated film with a second conversion treatment at a formation voltage lower than that of the first conversion treatment such that an anodic foil is formed; and forming a conductive polymeric layer on a surface of the anodic foil.

Employment of the solid electrolytic capacitor according to the present invention would achieve a high-voltage solid electrolytic capacitor having a rated voltage of several hundreds of volts while remarkable characteristics of solid electrolytic capacitors are maintained.

DETAILED DESCRIPTION OF THE INVENTION

Description of the Preferred Embodiment

Figure 1:
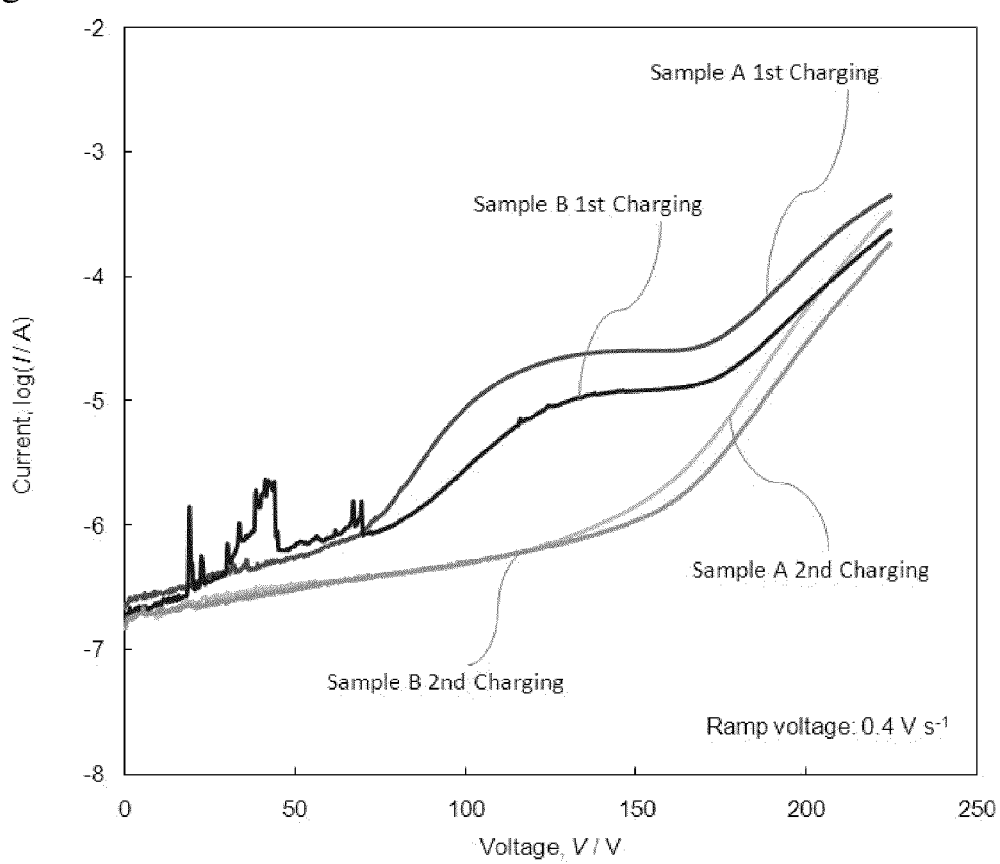
FIG. 1 is a view of the current-voltage behavior of Embodiment 1 of the solid electrolytic capacitor according to the present invention.

A detailed explanation of an embodiment will be given below.

Following is a description of the method for producing the solid electrolytic capacitor according to the present invention.

First, an anodic oxide film layer is formed on a roughened surface of an aluminum foil by way of a first conversion treatment.

Second, the oxide film layer is hydrated by way of boiling water immersion to be converted into a hydrated film.

Third, the hydrated film is provided with a second conversion treatment at a formation voltage lower than that of the first conversion treatment such that an anodic foil is formed. The second conversion treatment allows for formation of a dielectric oxide film having a withstand voltage equivalent to the formation voltage of the second conversion treatment, and further, a film having a hydrated film on the surface thereof is formed on the surface of the dielectric oxide film.

Fourth, the hydrated film contains moisture. Accordingly, a damage of the dielectric oxide film caused in the fabrication process of an electrolytic capacitor can be repaired by way of the anodic oxidation using the moisture during the aging process or the voltage application process.

Fifth, the present invention takes the advantage of the reparation effect even with the withstand voltage of the dielectric oxide film being several hundreds of volts, resulting in achievement of a high-voltage solid electrolytic capacitor having a rated voltage of several hundreds of volts.

In this context, the applicant focused on the low reformability of the electrolytic solution, which causes the withstand voltage of the Al/PEDOT capacitor to be quite low in comparison with a conventional electrolytic capacitor. Electrolytic solution of conventional electrolytic capacitors contains a great amount of oxygen source required for reformation of a film, with the examples of the oxygen source including moisture (several %) and ethylene glycol. However, PEDOT contains only a slight amount of moisture. Hence, it cannot be stated that the PEDOT has an excellent reformability. The water simply added to the PEDOT would very likely be evaporated during the PEDOT polymerization process (at 150° C. for 60 minutes), and thus, a type of water is required that can stably subsist even at relatively higher temperatures. Besides, in case where water is added to the PEDOT, the water in the bulk PEDOT would need to diffuse as far as the barrier film/PEDOT interface when the reformation by the electrolytic solution is in progress, leading to inefficient reformation. The applicant thus suggested, as a method for providing efficient reformability, to form a moisture-rich layer on the barrier film/PEDOT interface. In the present invention, after forming a conventional anode oxide film, a foil was immersed in boiling water and part of the barrier film was hydrated such that a Pseudoboehmite (PB) was formed. The method according to the present invention allows the electrodes to comprise Al/barrier film/PB/PEDOT/silver, carbon paste and the like. The PB stands for aluminum oxide that amply contains moisture, and can be represented as $Al2O3 \cdot 2H2O$ in a chemical formula, containing about 32 wt % of water.

(Embodiment 1)

In the solid electrolytic capacitor according to the present invention, a foil, KS117A8X, etched with direct current, was immersed in a boric acid/borax aqueous solution at 300 V, and a film was formed. The withstand voltage of the film was 300 V.

The etched foil was then immersed in boiling water for three minutes to form a hydrated film. Under the experimental condition of Embodiment 1, the withstand voltage of the film dropped to 200 V. This means that the withstand voltage was reduced by 100 V, which reduction was caused by the conversion of some part of the barrier film into PB.

Further, the etched foil on which a hydrated film was formed was reformed at 200 V, whereby an oxide film having a withstand voltage of 200 V in the boric acid/borax aqueous solution was obtained.

The PEDOT was formed under the conditions of 60° C. for 30 minutes, and 150° C. for 60 minutes. At this stage, no additives such as Lewis base were applied at all. After forming the oxide film, the PEDOT was coated, and the current-voltage behavior was measured. The results are shown in FIG. 1. FIG. 1 depicts the first and second measurements of the current-voltage behavior. The two measurements were conducted with respect to each of the samples A and B, respectively.

According to Embodiment 1, the samples had a withstand voltage of 200 V in the boric acid/borax aqueous solution without generating any short circuit. A short circuit would be generated at around 90 to 100 V without any hydrated film layer.

At the second measurement of the current-voltage behavior, the current value dropped, and an aging effect was observed.

The applicant focused on the initial characteristics, and a very reproducible withstand voltage was obtained.

(Embodiment 2)

Figure 2:
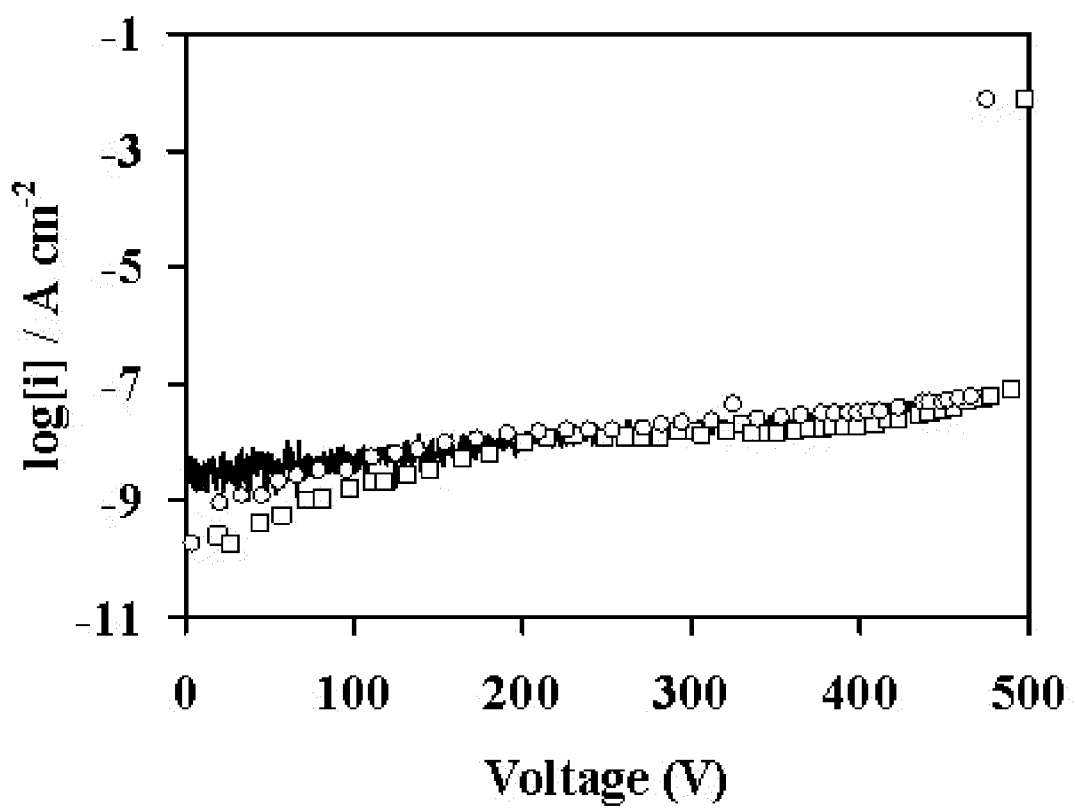
FIG. 2 is a view of the current-voltage behavior of Embodiment 2 of the solid electrolytic capacitor according to the present invention.

The first and second formations were conducted at 550 V and 450 V, respectively, in a manner similar to Embodiment 1. FIG. 2 shows the current-voltage behavior of 550 V to 450 V etched foil-based capacitors made using in-situ polymerized PEDOT. The withstand voltage power of the Vf to Vrf oxide is 450 V. The capacitors show a low, very stable leakage current below the withstand voltage, and exhibit short circuit at voltages above 450V. The oxide formation method according to the present application is very important for attaining such high voltages. The method consists of first forming an amorphous oxide of 550 Vf. An outer portion of the oxide is then hydrated in boiling water. The remaining barrier oxide is then reinforced by reforming the oxide to 450 Vrf.

(Embodiment 3)

Figure 3:
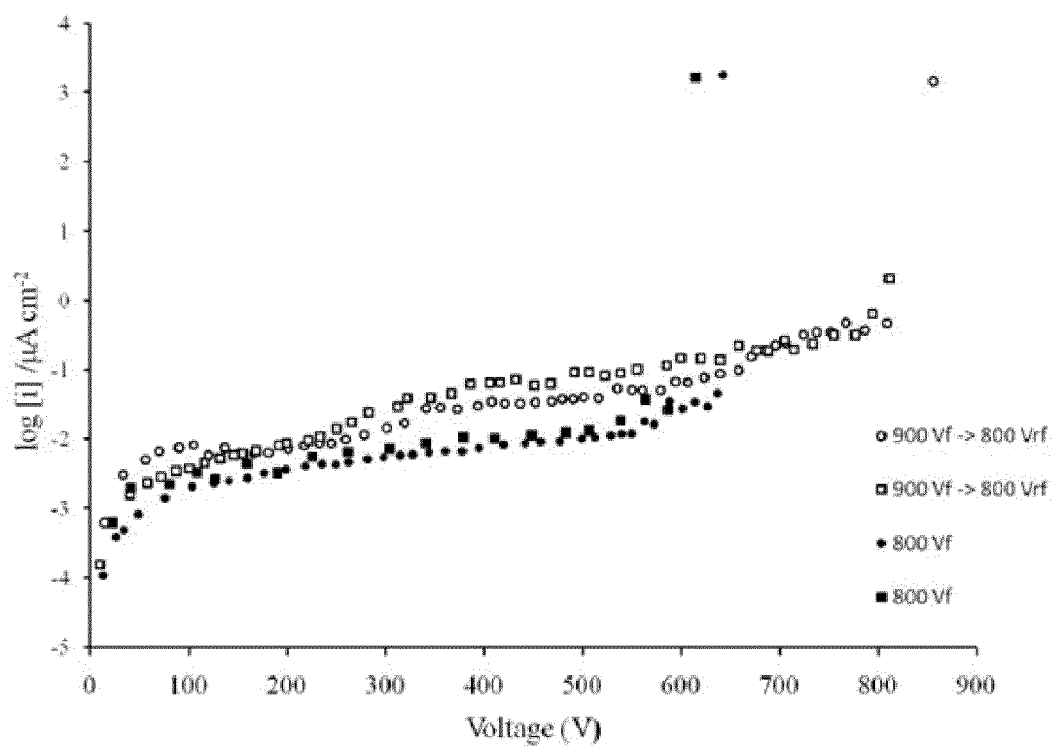
FIG. 3 is a view of the current-voltage behavior of Embodiment 3 of the solid electrolytic capacitor according to the present invention.

The third and fourth formations were conducted at 900 V and 800 V, respectively, in a manner similar to Embodiment 1. The fifth and sixth formations were conducted at 800 V and 800 V as comparative examples. FIG. 3 shows the current-voltage behavior of 900 V to 800 V etched foil-based capacitors made using in-situ polymerized PEDOT. The withstand voltage power of the Vf to Vrf oxide is 800 V. The capacitors show a low, very stable leakage current below the withstand voltage, and exhibit short circuit at voltages above 800 V. The oxide formation method according to the present application is very important for attaining such high voltages. The method consists of first forming an amorphous oxide of 900 Vf. An outer portion of the oxide is then hydrated in boiling water. The remaining barrier oxide is then reinforced by reforming the oxide to 800 Vrf.

What is claimed is:

1. A solid electrolytic capacitor wherein:
   an anodic oxide film layer is formed on a roughened surface of an aluminum foil by way of a first conversion treatment;
   a hydrated film is subsequently formed by way of boiling water immersion;
   the hydrated film is provided with a second conversion treatment at a formation voltage lower than that of the first conversion treatment such that an anodic foil is formed; and
   a conductive polymeric layer is formed on a surface of the anodic foil;
   wherein said first conversion treatment comprises a voltage in a range of approximately 300 to 900 V, and wherein said formation voltage of said second conversion treatment comprises a range of approximately 200 to 800 V.

2. A method for producing a solid electrolytic capacitor comprising the steps of:
   forming an anodic oxide film layer on a roughened surface of an aluminum foil by way of a first conversion treatment;
   subsequently forming a hydrated film by way of boiling water immersion;
   providing the hydrated film with a second conversion treatment at a formation voltage lower than that of the first conversion treatment such that an anodic foil is formed; and
   forming a conductive polymeric layer on a surface of the anodic foil;
   wherein said first conversion treatment comprises a voltage in a range of approximately 300 to 900 V, and wherein said formation voltage of said second conversion treatment comprises a range of approximately 200 to 800 V.

3. The solid electrolytic capacitor as claimed in claim 1 wherein the hydrated film is formed by boiling water immersion.

* * * * *